United States Patent [19]

Clyde et al.

[11] Patent Number: 5,800,850
[45] Date of Patent: Sep. 1, 1998

[54] PROCESS FOR REDUCING SPOILAGE OF STERILIZED LIQUID PRODUCTS

[75] Inventors: Gene Frank Clyde; Steven Soon-Young Kwon, both of New Milford, Conn.; Marianne Dorothy Potter, Marysville, Ohio; Dharam Vir Vadehra, New Milford; Elaine Regina Wedral, Sherman, both of Conn.

[73] Assignee: Nestec S.A., Vevey, Switzerland

[21] Appl. No.: 539,313

[22] Filed: Oct. 4, 1995

Related U.S. Application Data

[60] Provisional application No. 60/000,957, Jul. 7, 1995.
[51] Int. Cl.[6] .................................................. A23F 5/00
[52] U.S. Cl. .................... 426/45; 426/44; 426/590; 426/593; 426/594; 426/597; 426/662
[58] Field of Search ............................ 426/44, 45, 662, 426/35, 47, 55, 56, 590, 593, 594, 597

[56] References Cited

U.S. PATENT DOCUMENTS 4,980,182  12/1990  Kwon et al. ............................ 426/130
5,314,706  5/1994  Colarow .................................. 426/605

FOREIGN PATENT DOCUMENTS

| 0319064 | 6/1989 | European Pat. Off. . |
| 6344893 | 2/1988 | Japan . |
| 4135456 | 5/1992 | Japan . |
| 7123956 | 5/1995 | Japan . |

*Primary Examiner*—Leslie Wong
*Attorney, Agent, or Firm*—Vogt & O'Donnell, LLP

[57] ABSTRACT

Spoilage of heat-sterilized liquid food products is reduced by preparing the liquid food product, prior to sterilization, by mixing an enzymatically-modified phospholipid composition, particularly an enzymatically-modified phospholipid composition having a degree of conversion of greater than 90%, with the liquid food product. Liquid food products which may be so treated include, in particular, coffee, tea, or cocoa beverage-component solids which provide beverage products. Additionally, an enzymatically hydrolyzed phospholipid composition having a degree of conversion greater than 90% may be obtained by hydrolyzing phospholipids in an aqueous medium, wherein the amount of water is greater than one part per part phospholipids, under agitated conditions so that a degree of conversion greater than 90% is obtained.

20 Claims, No Drawings

PROCESS FOR REDUCING SPOILAGE OF STERILIZED LIQUID PRODUCTS

CROSS-REFERENCE TO RELATED APPLICATION

This is a non-provisional application of provisional Application Ser. No. 60/000,957, filed Jul. 7, 1995.

FIELD OF INVENTION

The present invention relates to preparing liquid heat-sterilised food products, such as a canned or bottled diary drink, and more particularly to reducing thermophilic spoilage due to spore-forming bacteria.

BACKGROUND OF THE INVENTION

In the preparation of canned or bottled white coffee, ingredients comprising instant coffee powder, milk, sucrose and water are mixed in the appropriate proportions, homogenised, canned and then sterilised or retorted at 121° C. for from about 20–30 minutes before cooling to ambient or refrigeration temperatures. In spite of the very high sterilising or retorting temperature, some bacterial spores may even survive and these surviving spores can germinate and multiply during storage, especially in vending machines in the winter months where the storage temperature is usually from 55° to 60° C. The presence of these surviving spores can cause spoilage by imparting a flat, sour flavour to the coffee drink. Some spores may survive in foodstuffs which undergo ultra high temperature ("UHT") sterilisation, e.g. from about 140°–150° C. for from about 5 to 20 seconds.

Japanese Patent Application No. JP-A-62 224273 teaches that the rancidity in a canned drink, such as canned coffee, can be prevented by heat sterilising it in the presence of a sucrose fatty acid ester. However, sucrose fatty acid ester is a chemically processed ingredient only approved in a few countries.

SUMMARY OF THE INVENTION

We have surprisingly found that by sterilising a liquid food preparation or product in the presence of an enzymatically modified phospholipid, which is a natural ingredient, the spoilage of the product after it has been heat-sterilised is significantly less than by sterilising in the presence of ordinary phosphatides such as lecithin.

According to the present invention, there is provided a process for the preparation of a liquid heat-sterilised food which comprises mixing the ingredients and sterilising the mixture of ingredients characterised in that sterilisation of the mixture of ingredients is carried out in the presence of an enzymatically-hydrolysed phospholipid.

Additionally, the present invention provides a process for enzymatically hydrolyzing a phospholipid characterized in that a phospholipid is treated with a phospholipase in an aqueous medium comprising, by weight based upon the weight of the phospholipids, water in an amount greater than 1 part per part phospholipid, under agitated conditions so that a degree of conversion of greater than 90 mol % is obtained.

DETAILED DESCRIPTION OF THE INVENTION

In accordance with the present invention, the liquid heat-sterilised food may be, for instance, a dairy product such as white coffee, or cocoa or tea. The heat-sterilisation may be carried out in an air-tight vessel, e.g. when the liquid food is canned or bottled. The ingredients of white coffee may be instant coffee powder, coffee extract, coffee concentrate or roast and ground coffee together with water, sucrose and milk, as well as with small amounts of optional ingredients such as dipotassium phosphate and sodium bicarbonate. Preferably, the milk ingredient is a mixture of high-fat cream and skim milk powder.

The enzymatically-hydrolysed phospholipid is produced by the action of a phospholipase on the phospholipid to give a lysophospholipid. Phospholipids, which may advantageously be used in a powdered or paste form, form a class of chemical compounds comprising phosphatidylcholine (lecithin) and phosphatidylethanolamine as the main elements. Phospholipase A is an enzyme which may be manufactured from porcine pancreatic glands and which hydrolyses phospholipids by specific cleavage of the bond binding a fatty acid ester to the glycerol part of the phospholipid molecule thereby replacing the fatty acid ester by a hydroxyl group. The hydrolysis results in an increase of free fatty acids and a conversion of the phosphatidylcholine (lecithin) and phosphatidylethanolamine into several substrates such as lysophosphatidylcholine, lysophosphatidylethanolamine, phosphatidylcholine glycerol and phosphatidylethanolamine glycerol. Phospholipase A-2 (sold commercially under the Trade Name LECITASE) is the preferred enzyme and cleaves the bond binding a fatty acid ester to the glycerol part of the phospholipid molecule, mainly at position 2. The degree of conversion is the proportion of phosphatidylcholine present before hydrolysis that is converted into lysophosphatidylcholine, expressed in mol%. In the present invention, the enzymatically-hydrolysed phospholipid preferably has a degree of conversion of at least 90% and more preferably, of at least 95%.

The enzymatically-hydrolysed phospholipid is conveniently an enzymatically-hydrolysed lecithin which is produced by the action of phospholipase A-2 on the lecithin to give a lysolecithin. Commercial lecithin is predominantly soybean lecithin obtained as a by-product in the manufacture of soybean oil. Lecithin can also be isolated from eggs and can be obtained synthetically. It can be used in a powdered or paste form.

One method for the enzymatic hydrolysis of phospholipids is claimed in Japanese Laid-open Patent Application No. JP-A-63 44893 in which the phospholipid is hydrolysed with phospholipase A after adding 0.1 to 1 part by weight of water to 1 part by weight of phospholipid. The degree of conversion of phospholipid to lysophospholipid in the practical embodiments varies from 80 to 90%. It is stated that larger amounts of water and/or agitated conditions give lower degrees of conversion.

We have found that by using more than 1 part by weight of water to 1 part by weight of phospholipid in the enzymatic hydrolysis of a phospholipid using agitated conditions, we can obtain a degree of conversion greater than 90% or even 95%.

In carrying out the hydrolysis process of the present invention, the amount of water present in the aqueous medium is preferably from 1.5 to 7.5 parts, more preferably from 2 to 6 parts, even more preferably from 3 to 5 parts, and most preferably from 3.5 to 4.5 parts by weight per part by weight of phospholipid. The water of the aqueous medium may be ordinary tap water, distilled water, or ion-exchanged water.

The amount of the phospholipid may be from 5 to 40%, preferably from 10 to 30% and especially from 15 to 25% by weight based on the weight of the reaction mixture. The phospholipid may be added in one, two or more stages. The phospholipase may be used in an amount of from 0.05 to 0.5%, preferably from 0.1 to 0.4% and especially from 0.15 to 0.3% by weight based on the weight of the aqueous medium. The enzymatic reaction is preferably carried with slow or gentle agitation.

The presence of a water-soluble calcium salt, e.g. 0.01 to 0.25% and preferably from 0.025 to 0.15% by weight based on the weight of the aqueous medium, is desirable during the reaction. Calcium is a co-factor to the phospholipase enzyme. Calcium chloride is the preferred salt and is most preferably used in the dihydrate form.

The hydrolysis is carried out conveniently in the aqueous medium at a temperature of from 25° C. to 70° C., preferably from 30° C. to 60° C., more preferably from 40° C. to 55° C., and at a pH of from 5 to 9 and preferably of from 6 to 8. The duration of the hydrolysis reaction may conveniently be from 30 minutes to 5 hours, preferably from 1 to 4 hours, and more preferably from 1.5 to 3 hours. Although longer times may be used, e.g. up to 50 hours, there is no special advantage obtained in using such longer periods.

After the reaction, the mixture is advantageously pasteurised and then dried. After pasteurisation and before drying, antioxidants such as Vitamin C, Vitamin E, tea extracts, and/or BHA/BHT may be added to protect the flavour, and a carrier such as maltodextrin, non-fat dried milk, starch, or gum arabic, may be added to the mixture. The enzymatically-hydrolysed phospholipid may be used in a powder or paste form.

As stated above, sterilisation has been carried out usually at a temperature of about 121° C., e.g. 1150° to 125° C., over a period of from about 20–30 minutes, or under UHT conditions, e.g. 140° to 150° C. for from 5 to 20 seconds, and such conditions may be used in the present invention. However, we have found that, by sterilising at 121° C. in the presence of an enzymatically-modified phospholipid in accordance with the present invention, the spoilage of liquid heat-sterilised food preparations is significantly less than by sterilising in the presence of ordinary phosphatides even if the period of the sterilisation is much less than 30 minutes. For instance, we have found that periods as low as 5 minutes, preferably from 6 to 15 minutes and more preferably from 7 to 10 minutes, can achieve reduced spoilage.

The amount of enzymatically-hydrolysed phospholipid present in the liquid heat-sterilised food may be from 0.005 to 2%, preferably from 0.01 to 1.25%, more preferably from 0.025 to 1.0% and especially from 0.04 to 0.75% by weight based on the weight of the mixture.

In the preparation of canned or bottled white coffee, the coffee ingredients and the enzymatically-hydrolysed phospholipid are mixed in the appropriate proportions, homogenised, canned or bottled, and then sterilised or retorted, followed by cooling to ambient or refrigeration temperatures. The amount of the enzymatically-hydrolysed phospholipid may be from 0.1 to 15%, preferably from 0.25 to 10%, more preferably from 0.5 to 7.5% and especially from 1.0 to 5.0% by weight based on the weight of the coffee solids. The canned or bottled white coffee is transported and normally stored at ambient or refrigeration temperatures. If used in a vending machine, the storage temperature during the winter months may be from about 55°–60° C., and we have found that by sterilising the ingredients in the presence of an enzymatically hydrolysed phospholipid in accordance with the present invention, there is significantly less spoilage of the coffee drink than when sterilising the ingredients alone or in the presence of conventional emulsifiers such as a phospholipid which has not been enzymatically hydrolysed. The coffee drink may be stored for several weeks without spoilage.

EXAMPLES

The following Examples further illustrate the present invention. Parts and percentages are given by weight. The powdered enzymatically hydrolysed lecithin used in the Examples according to the invention was prepared as follows:

100 parts of tap water is slowly stirred in a jacketed kettle at 30° C. and at pH 8. 0.1 part of calcium chloride dihydrate and 0.22 part of phospholipase A-2 are added and the pH adjusted to 7, if necessary, by using 10N potassium hydroxide while the temperature is slowly increased to 50° C. 10 parts of powdered deoiled soy lecithin (half the total) are slowly added to the mixture, whereupon an immediate drop in the pH is observed which indicates that an enzymatic reaction is taking place. The pH is readjusted to 7 by using 10N potassium hydroxide, and the reaction is allowed to proceed for 30 minutes, after which time a further 10 parts (the second half) of the lecithin is added and the reaction is allowed to proceed for a further 90 minutes with the necessary pH adjustment to 8 as before. After the reaction, the product is pasteurised by heating to 95° C. for 5 minutes to deactivate the enzyme and then cooled to 75° C. 10 parts of maltodextrin is added, and the product is mixed into a homogeneous slurry while being cooled to ambient temperature. The slurried product is finally spray-dried at a rate of about 0.3 kg per minute where the inlet temperature is 160° C. and the outlet temperature is 95° C.

Example 1

A white coffee mix is prepared by mixing the following ingredients in the amounts indicated:

| Water | 85.815 |
|---|---|
| Cream, 40% fat | 2.260 |
| Skim milk powder | 2.160 |
| Sucrose | 5.500 |
| Coffee Powder, NESCAFE Classic | 1.100 |
| Dipotassium phosphate | 0.080 |
| Sodium bicarbonate | 0.060 |
| Enzyme Modified lecithin powder (50% maltodextrin) | 0.025 |
| Sucrose ester P-1670 | — |
| Water to standarize | 3.000 |
| Total | 100.000% |

After mixing the ingredients, the mix is heated to 76° C., canned, retorted at 121° C. for 8 minutes and cooled to ambient temperature. The canned white coffee is incubated at 60° C. for 14 days, after which time the spoilage was less than 1% (0/100 cans), and pH drop was zero.

Example 2

A similar procedure to that carried out in Example 1 was followed except that, after canning, the mix was held at 76° C. for three hours before retorting. The canned white coffee is incubated at 60° C. for 14 days, after which time the spoilage was less than 1% (0/100 cans), and pH drop was zero.

Example 3

A similar procedure to that carried out in Example 1 was followed but using 0.25%, instead of 0.025%, [of] powdered enzymatically-hydrolysed lecithin based on the total weight of the coffee mix. The canned white coffee is incubated at 60° C. for 14 days, after which time the spoilage was less than 1% (0/100 cans), and pH drop was zero.

Comparative Example A

A similar procedure to that carried out in Example 1 was followed, but excluding the powdered enzymatically-hydrolysed lecithin. After incubation of the canned white coffee at 60° C. for 14 days, the spoilage was 99% and the pH drop was 90/91.

Comparative Example B

A similar procedure to that carried out in Example 1 was followed, but adding 0.25% of powdered lecithin instead of the powdered enzymatically-hydrolysed lecithin there used. After incubation of the canned white coffee at 60° C. for 14 days, the spoilage was 7.5% and the pH drop was 6/79.

Comparative Example C

A similar procedure to that carried out in Example 1 was followed, but adding 0.2% of powdered lecithin instead of the powdered enzymatically-hydrolysed lecithin there used. After incubation of the canned white coffee at 60° C. for 14 days, the spoilage was 48% and the pH drop was 42/87.

Comparative Example D

A similar procedure to that carried out in Example 1 was followed, but adding a mixture of 0.09% Durem 207 (mono and diglycerides) supplied by Van den Berg Food and 0.01% TWEEN 80 (polyoxyethylene sorbitan monooleate) instead of the powdered enzymatically-hydrolyzed lecithin there used. After incubation of the canned white coffee at 60° C. for 14 days, the spoilage was 27% and the pH drop was 24/90.

Comparative Example E

A similar procedure to that carried out in Example 1 was followed, but adding a mixture of 0.09% DUREM 207 and 0.01% PANODAN PVK (diacetyl tartaric acid ester of monoglycerides) supplied by Grindsted Ingredients, instead of the powdered enzymatically-hydrolysed lecithin there used. After incubation of the canned white coffee at 60° C. for 14 days, the spoilage was 20% and the pH drop was 18/90.

We claim:

1. A process for preparing and reducing spoilage of a heat-sterilized liquid food product comprising mixing an enzymatically-modified phospholipid composition comprising a phosphatidylcholine component, wherein greater than 90 mol % of the phosphatidylcholine component is lysophosphatidylcholine, in a liquid food product to obtain a food product and lysophospholipid mixture and heating the mixture for sterilizing the mixture for obtaining a sterilized liquid food product.

2. A process according to claim 1 wherein the liquid food product is a beverage which comprises beverage-component solids selected from the group consisting of coffee, tea and cocoa solids.

3. A process according to claim 1 wherein the liquid food product is a beverage which comprises coffee solids and milk solids.

4. A process for preparing and reducing spoilage of a heat-sterilized liquid food product comprising mixing an enzymatically-modified phospholipid composition compris- ing lysophospholipids with a liquid food product comprising beverage-component solids selected from the group consisting of coffee, tea and cocoa solids to obtain a liquid food product and lysophospholipid mixture and heating the mixture for sterilizing the mixture to obtain a sterilized liquid food product.

5. A process according to claim 4 wherein the liquid food product is a beverage which comprises coffee solids and further comprises milk solids.

6. A process according to claim 3 or 5 further comprising, prior to heating, homogenizing the mixture.

7. A process according to claim 1 or 3 wherein the mixture is heated at a temperature of from 115° C. to 125° C. for a time of from 5 minutes to 30 minutes.

8. A process according to claim 7 wherein the mixture is heated for from 6 minutes to 15 minutes.

9. A process according to claim 1 or 4 wherein the phospholipid composition is mixed with the liquid food product so that the liquid food product comprises the phospholipid composition in an amount of from 0.005% to 2% by weight.

10. A process according to claim 1 or 4 wherein the liquid food product is a beverage which comprises coffee solids and wherein, by weight, based upon the weight of the coffee solids, the phospholipid composition is in an amount of from 0.1% to 15%.

11. A process according to claim 1 or 4 wherein the phospholipid composition has been prepared by enzymatically hydrolyzing phospholipids, comprised of a phosphatidylcholine component, with a phospholipase in an aqueous medium, which comprises, by weight based upon the weight of the phospholipids, water in an amount greater than one part water per part phospholipids, under agitated conditions so that greater than 90 mol% of the phosphatidylcholine is converted to lysophosphatidylcholine.

12. A process according to claim 11 wherein the phospholipid composition has been prepared with the water in an amount of from 1.5 parts to 7.5 parts per part phospholipids and with the aqueous medium containing water-soluble calcium salt components and with the phospholipids comprised of lecithin.

13. A process for preparing an enzymatically hydrolyzed phospholipid composition comprising hydrolyzing phospholipids, which comprise phosphatidylcholine, with a phospholipase in an aqueous medium, which comprises, by weight based upon a weight of the phospholipids, water in an amount greater than one part per part phospholipids, under agitated conditions so that greater than 90 mol % of the phosphatidylcholine is converted to lysophosphatidylcholine.

14. A process according to claim 13 wherein the water is in an amount of from 1.5 parts to 7.5 parts per part phospholipids.

15. A process according to claim 13 or 14 wherein the aqueous medium further comprises water-soluble calcium salt components.

16. A process according to claim 13 wherein the phospholipids comprise lecithin.

17. The sterilized product of the process of claim 1 or 4.

18. The sterilized product of the process of claim 3 or 5.

19. The sterilized product of the process of claim 11.

20. A sterilized coffee beverage comprising a phospholipid composition comprising a phosphatidylcholine component wherein greater than 90 mol % of the phosphatidylcholine component is lysophosphatidylcholine.

* * * * *